(12) United States Patent
Reumerman et al.

(10) Patent No.: US 8,560,091 B2
(45) Date of Patent: Oct. 15, 2013

(54) METHOD OF GUIDING A USER FROM AN INITIAL POSITION TO A DESTINATION IN A PUBLIC AREA

(75) Inventors: Hans-juergen Reumerman, Eindhoven (NL); Andrew Alexander Tokmakoff, Eindhoven (NL); Adrianus Sempel, Waalre (NL); Matthias Wendt, Wuerselen (DE)

(73) Assignee: Koninklijke Philips N.V., Eindhoven (NL)

( * ) Notice: Subject to any disclaimer, the term of this patent is extended or adjusted under 35 U.S.C. 154(b) by 449 days.

(21) Appl. No.: 12/934,688

(22) PCT Filed: Mar. 31, 2009

(86) PCT No.: PCT/IB2009/051347
§ 371 (c)(1),
(2), (4) Date: Sep. 27, 2010

(87) PCT Pub. No.: WO2009/122356
PCT Pub. Date: Oct. 8, 2009

(65) Prior Publication Data
US 2011/0022201 A1     Jan. 27, 2011

(30) Foreign Application Priority Data
Apr. 3, 2008 (EP) .................................... 08103357

(51) Int. Cl.
*G06F 19/00* (2011.01)
*G08G 1/095* (2006.01)
*H05B 37/02* (2006.01)

(52) U.S. Cl.
CPC ..................................... *H05B 37/02* (2013.01)
USPC ........................................... 700/19; 340/944

(58) Field of Classification Search
CPC ....................................................... H05B 37/02
USPC .................. 700/11, 19; 340/332, 944; 362/84
See application file for complete search history.

(56) References Cited

U.S. PATENT DOCUMENTS

| 5,815,068 | A | 9/1998 | Vadseth |
| 6,646,545 | B2 | 11/2003 | Bligh |

(Continued)

FOREIGN PATENT DOCUMENTS

| JP | 2003289393 A | 10/2003 |
| WO | 9639687 A1 | 12/1996 |
| WO | 2005070067 A2 | 8/2005 |

*Primary Examiner* — Dave Robertson
(74) *Attorney, Agent, or Firm* — John F. Salazar; Mark L. Beloborodov

(57) ABSTRACT

The invention describes a method of guiding a user (1) from an initial position (S) to a destination (T), chosen from among a plurality of possible destinations (T), in a public area (2) over which is distributed a plurality of lighting arrangements ($L_i, L_2, \ldots, L_n$) each of which can be driven to render one or more light patterns from a plurality of light patterns. The method comprises the steps of determining the chosen destination (T) by obtaining a destination descriptor (13) from the user (1), allocating a specific light pattern from the plurality of light patterns to the chosen destination (T), providing the user (1) with a depiction ($V_T$) of the specific light pattern allocated to the chosen destination (T), selecting a number of lighting arrangements ($L_1, L_2, \ldots, L_n$) between a starting point (S) of the user (1) and the chosen destination (T), and driving the selected lighting arrangements ($L_1, L_2, \ldots, L_n$) such that the selected lighting arrangements ($L_1, L_2, \ldots, L_n$) between the starting point (S) of the user (1) and the chosen destination (T) render the specific light pattern. The invention further describes a system for guiding a user (1) from an initial position (S) to a destination (T) in a public area (2).

10 Claims, 4 Drawing Sheets

(56) References Cited

U.S. PATENT DOCUMENTS

| | | | |
|---|---|---|---|
| 6,896,388 B2 * | 5/2005 | George et al. | 362/84 |
| 7,255,454 B2 * | 8/2007 | Peterson | 362/147 |
| 7,271,739 B2 * | 9/2007 | Higelin | 340/944 |
| 7,332,877 B2 * | 2/2008 | Crodian et al. | 315/297 |
| 8,175,803 B2 * | 5/2012 | Caraballo | 701/426 |
| 2004/0051644 A1 | 3/2004 | Tamayama et al. | |
| 2006/0125657 A1 | 6/2006 | Higelin | |
| 2008/0238649 A1 * | 10/2008 | Arszman et al. | 340/471 |

\* cited by examiner

METHOD OF GUIDING A USER FROM AN INITIAL POSITION TO A DESTINATION IN A PUBLIC AREA

FIELD OF THE INVENTION

The invention describes a method of guiding a user from an initial position to a destination in a public area. The invention further describes a system for guiding a user from an initial position to a destination in a public area.

BACKGROUND OF THE INVENTION

In public areas such as shopping malls, airports, hospitals, libraries, trade fairs, etc., it can be difficult, particularly if one is new to the area, to determine where one is relative to a desired target. A visitor to the public area, particularly when pressed for time, will not want to walk a long distance before finding his desired target location, such as a shop, doctor's practice, or office. One possible solution to this problem, often found in some such public areas, is an overview in the form of a two-dimensional map erected at one or more strategic points such as close to an entrance or close to an escalator. However, in order to find out where he is in the public area and the direction in which he must go, a user must first locate the overview itself.

Even if a customer has the time to locate and consult such an overview, the graphical presentation is not always clearly understandable. While one customer or visitor might comprehend at a glance the direction he should take, not everyone is able to understand such a map or overview, and some people have difficulty with orientation. An alternative to a two-dimensional floor plan displayed in a public area is an electronic map, for example a graphic layout of a public area for display in a hand-held device. A user of such a device can browse through different levels of the public area, and can plan a route to a destination. However, because many public areas such as shopping malls often include hundreds of shops or stores, it is not always feasible to include the names of each of these shops on such an overview. To further complicate the issue, a shop might close down and be replaced by another, requiring that these physical overviews are manually altered or replaced whenever such changes take place.

Obviously, this type of maintenance is costly and time-consuming, and, if not carried out punctually, may cause dissatisfaction or frustration on the part of the user if, for example, he cannot locate his desired target on the overview, or worse, if he is directed to a no longer existing shop in the public area. Added to this is the problem presented by different languages. A tourist or non-native visitor to the public area may simply not be able to understand the meaning of the text in the overview.

Therefore, it is an object of the invention to provide a better way of guiding a user to a desired target while avoiding the problems mentioned above.

SUMMARY OF THE INVENTION

To this end, the present invention describes a method of guiding a user from an initial position to a destination, chosen from among a plurality of possible destinations, in a public area over which is distributed a plurality of lighting arrangements each of which can be driven to render one or more light patterns from a plurality of light patterns. The method of providing a light guidance system according to the invention comprises the steps of determining the chosen destination by obtaining a destination descriptor from the user, allocating a specific light pattern from the plurality of light patterns to the chosen destination, providing the user with a depiction of the specific light pattern allocated to the chosen destination, selecting a number of lighting arrangements between a starting point of the user and the chosen destination, and driving the selected lighting arrangements such that the selected lighting arrangements between the starting point of the user and the chosen destination render the specific light pattern.

A public area in this sense is an area or concourse generally accessible to any number of visitors, such as, for example, a shopping mall, an airport, a hospital, etc. The public area may comprise a single building or a group of buildings. Visitors to the public area—customers, clients, patients, etc.—can be assumed in the following to be pedestrian, i.e. to be underway on foot. Naturally, it will not be ruled out that a visitor to such a public area may also be assisted by some kind of mode of transport such as a scooter, motorised wheelchair, etc. The initial position of the visitor (also referred to as user or customer in the following) may be some point of entry to the public area, for example a main entrance or an entrance leading from a car park to the public area, and the chosen destination of the user can be a shop, office, etc., to which he wishes to be guided.

Using the method according to the invention, the user is provided with a personalised or customised guidance from his initial position to his target destination by means of a specific light pattern associated with his chosen destination. So that the user can easily recognise the light pattern when rendered using the lighting arrangements, the user is given a visual depiction of the specific light pattern in advance, for example by being shown the light pattern in a screen as it will appear when rendered. An obvious advantage of the present invention is that only those lighting arrangements that are positioned between the user's initial position and the destination need be driven to render the specific light pattern—other lighting arrangements will be left unaffected. Furthermore, any other visitors to the public area may see the light patterns, but will only receive them as decorative, aesthetic, or even entertaining, and will not otherwise be affected or disturbed by the light patterns. A particular advantage of the invention is that a number of users can be guided to different destinations in an unobtrusive manner, since the light patterns can be generated noiselessly.

It will be mentioned at this point that the steps of the method of providing guidance to a user can be carried out in any suitable sequence, for example a light pattern can have been allocated to a destination before the user chooses this destination as his target.

An appropriate light guidance system for guiding a user from an initial position to a destination in a public area comprises a plurality of lighting arrangements distributed over the public area, which lighting arrangements can be driven to render one or more light patterns from a plurality of light patterns, and a light pattern allocator for allocating a specific light pattern from the plurality of light patterns to a chosen destination. The light guidance system comprises a user interface for obtaining a destination description from the user and for providing the user with a depiction of a specific light pattern allocated to the destination, a selecting unit for selecting a number of lighting arrangements between the initial position of the user and the chosen destination, and a rendering interface for driving the selected lighting arrangements between the starting point of the user and the chosen destination to render the specific light pattern.

The dependent claims and the subsequent description disclose particularly advantageous embodiments and features of the invention.

A 'light pattern' in this context is a visually perceptible effect generated by a lighting arrangement. A light pattern can comprise one or more colours that may remain constant or may change during rendering, and may comprise certain effects such as flashing, blinking, moving, etc. For example, a light pattern can comprise a blue light that appears to 'move' along a wall, or an orange 'light bubble' that appears to travel directly in front of the user, in the direction of the chosen destination.

A lighting arrangement comprising only a single light source would obviously be limited in the range of light patterns that it could render. Evidently, more interesting light patters can be achieved with more light sources, particularly if these can be driven in a controlled manner. Therefore, in a preferred embodiment of the invention, a lighting arrangement comprises a plurality of individual light sources, and a light pattern is generated by applying a rendering sequence to the lighting arrangement such that, when a lighting arrangement is driven to render a light pattern, individual light sources of the lighting arrangement are controlled according to the rendering sequence. The rendering sequence preferably comprises a programme or sequence of instructions/commands that can be interpreted and applied to the light sources, as will be explained below. The light sources of the lighting arrangement can be controlled individually, collectively, or as a number of groups for example groups of three or four light sources. Any of these light sources can be controlled to be turned on, turned off, to be dimmed, to flash, or to adjust its colour.

In a further preferred embodiment of the invention, the specific light pattern is associated with a desired product or service provided at the chosen destination of the user. The 'chosen destination' in this sense does not need to be one single destination, such as one particular shop, but can comprise a number of possible destinations. For example, if a visitor requests to be guided to 'glassware', without specifying the name of a shop, the light guidance system can guide him to one or more locations in the public area that sell or display glassware. To this end, the light guidance system can identify relevant shops in the public area, work out a suitable route, select the appropriate lighting arrangements along that route, and allocate a light pattern to the destination. By controlling the selected lighting arrangements to render this specific light pattern, the visitor can allow himself to be guided to each of the locations corresponding to his chosen destination. For example, the selected lighting arrangements between the visitor and the various glassware destinations can be driven to render a deep blue light. The visitor can then easily locate one or more of these destinations in the public area.

Light patterns for the possible destinations in a public area could be predefined, so that, when a visitor chooses a destination, he is given a visual depiction of the corresponding predefined light pattern. The visitor might do this directly at a suitable point in the public area, for example at a console with a user interface, located for this purpose near an entrance or other strategic position. This way of allocating a light pattern to a destination is quite straightforward to realise, and may be advantageous for a public area such as a hospital with a relatively restricted number of destinations. An alternative, more economical approach for a public area such as a hospital or museum might be to print visual depictions of predefined light patterns in a brochure available to visitors.

To control the interaction and behaviour of the various elements described, such as lighting arrangements, user interface, rendering interfaces etc., a light guidance system according to the invention preferably comprises a control arrangement, which can be a central control arrangement, for instance a central server or processor, or can comprise a distributed control arrangement with a number of servers or processors connected in an appropriate manner. This control arrangement preferably also comprises a storage medium for storing predefined light patterns in the form of appropriate programming or rendering sequences. A suitable computer programme running on a processor of the control arrangement can issue control signals to the lighting arrangements of the light guidance system and can keep track of light patterns that are being rendered. The control arrangement can also ensure that the same light pattern is not chosen by two visitors with different destinations, or can reserve light patterns for use with certain destinations or by certain visitors, as will be explained below.

As already indicated, the light guidance system for a particular public area might be provided with a number of predefined light patterns, or these could be programmed by an administrator. However, frequent visitors to that public area might like to define their own, 'personal' light patterns. Therefore, the light guidance system according to the invention can preferably also store a light pattern composed by a user, so that this can be retrieved from the storage medium as required. Such a customised approach to light guidance is made possible by the use of 'intelligent', controllable light sources. Allowing a user to choose his own light pattern might be particularly attractive for a business wishing to offer certain customers a 'fast lane' service.

There are a number of ways in which a user can specify his own, personal light pattern. For example, by means of a fairly simple user interface such as a console located at some point in the public area, the visitor to the public area could choose a destination from a list of possible destinations, and then proceed to choose a colour, pattern, logo etc. to be rendered to guide him to his destination. The user interface can be entirely graphical, or can use a combination of text, graphics and possibly also a speech interface to allow an intuitive and straightforward communication with the user.

The customisation of the light pattern to the wishes of the user can be taken a step further, owing to the possibilities offered by present-day modes of communication such as the internet, which allow fast and uncomplicated exchange of information between devices and systems. Therefore, in a further preferred embodiment of the invention, a specific light pattern is associated with the chosen destination prior to arrival of the user at the initial position in the public area. For example, by interacting with a website for that public area, on a PC or handheld device, the user can chose locations that he wants to visit from, say, a drop down menu, from a list of search results, or from a graphic representation of the floor plan of the public area. Then, using an additional feature of that website, the user might choose a colour, pattern, logo etc. to be rendered when he arrives at the public area. Preferably, the visual depiction of a light pattern realistically mimics the actual rendered light pattern. In this way, the user, before even leaving home, can plan his visit to a public area that avails of a light guidance system. Evidently, the destination chosen by the user is not limited to one type of target, such as a single shop or a number shops selling the same type of product. In the light guidance system according to the invention, the 'chosen destination' can be a set or list of different locations in the public area. For example, the user might wish to visit a shoe shop, a bookstore, a travel agency, and a restaurant. He can specify his chosen destination in advance, as described above, and the light guidance system can determine the most efficient route for him to follow while guided by a specific light pattern.

In a further preferred embodiment of the light guidance system according to the invention, the user interface is located external to the public area, and the user interface is connected to the control arrangement by means of a suitable network such as the internet or other wireless communications network. For example, the user can prepare his route at home using a personal computer, and can enter his destination using, for example, a website of the public area or shop in the public area that he wishes to visit. Since many handheld devices such as mobile telephones or personal organisers also offer internet access, the user might prepare his route and select or compile a light pattern using such a device. Communication between the user interface—personal computer, mobile phone etc., can take place in the usual manner, i.e. over broadband, wireless LAN, etc. In another alternative realisation, the user can prepare a route or enter a destination in a mobile device before arriving at the public area. Transfer of the specified information can then take place automatically, for example by means of a Bluetooth® interface, when the user enters the public area and passes a corresponding sensor.

Since the specific light pattern is intended for guiding the user from a starting point to his destination, it follows that the specific light pattern should only be rendered from that time that the user is actually ready to depart from the initial position to his chosen destination. Therefore, in a particularly preferred embodiment of the invention, the specific light pattern is rendered in response to a signal generated by a trigger event. This trigger event then causes the specific light patterns to be rendered by the light guidance system. The trigger event can occur, for example, when a visitor chooses a destination from a console in the public area. In the case of a specific light pattern chosen by the user in advance, the trigger event can occur when the visitor makes his arrival known by, for example, entering some appropriate command or code into the type of console described above. A trigger event can also interrupt or end the rendering of the light pattern, for example when the user arrives at his destination, when he makes a detour on his journey to his chosen destination, or if he leaves the public area without actually arriving at his chosen destination.

Naturally, it would be more convenient for the user if the trigger event were to occur automatically, so that the user does not have to specifically announce his arrival. Furthermore, it would be more advantageous from the user's point of view if he does not have to first locate a specific point in the public area in order to register at a console or to swipe a customer card at a dedicated card reader to make his arrival known. The visitor would prefer to head straight for his chosen destination, following the specific light patterns that are rendered as soon as he arrives in the public area. Therefore, in a particularly preferred embodiment of the invention, the trigger signal is generated when the presence of the user is detected in the public area. The presence of the user or visitor could be detected in a particularly straightforward way by using RFID (radio-frequency identification) technology. Many people already carry some kind of card such as a customer card that includes an RFID tag. In a light guidance system that can detect such tags, a user would only need to register once with the light guidance system to be automatically detected thereafter whenever he visits that public area. The control arrangement of the light guidance system can be realised to receive information from detectors or readers positioned about the public area, and to analyse this information with regard to certain visitors, and to control selected lighting arrangements accordingly. If a service provider of a light guidance system in a public area wishes to levy a charge for guiding a visitor or for customising a light pattern, the visitor's customer card could also be used to automatically debit the user's account by sending transaction data to the control arrangement on which basis a customer, shop or other client can pay for this guidance service. The debiting could preferably be performed using the control arrangement.

A specific light pattern, intended to guide a visitor to his chosen destination, might be rendered for a certain predefined duration after generation of the trigger signal. For example, the specific light pattern might be rendered for the estimated amount of time required by the visitor to travel from the initial position to his chosen destination. However, since it is not feasible to predict such a time with any accuracy, and since it would be irritating for the user if the specific light pattern were to 'disappear' before he has found his chosen destination, the light guidance system can detect the arrival of the visitor at his destination, for example by means of an RFID 'reader'—also called detector or sensor—positioned at the destination for detecting a tag on, for example, the visitor's customer card. This allows the light guidance system to render the light patterns until the visitor has reached his destination.

When a user of such a system is underway to keep an appointment, for example with a doctor or specialist in a clinic, the user will prefer to be guided directly through the public area to his destination. However, when shopping, the user of the system, like many consumers, may like to browse in other shops while on the way to his destination. Therefore, it may be advantageous to keep track of the user's movements in the public area, and to control the lighting arrangements accordingly. Again, this can be easily accomplished with RFID tags. By simply positioning suitable readers about the public area, or using already installed readers, the light guidance system can determine if the user is still following the light patterns on his way to his destination, or whether the route to the visitor's chosen destination should be computed again, for instance if the user decides to take a different path or to make a detour into another shop. When the light guidance system determines that the user has interrupted his journey to his chosen destination, the specific light patterns for that user can be deactivated ('paused'), and reactivated when he resumes his journey and passes another reader. By making use of RFID readers in this way, the light guidance system can always compute the fastest or shortest route to the user's chosen destination. Equally, if the user leaves the public area without having visited his destination, this can be detected by means of an RFID reader located at an exit of the public area, and the rendering of the light pattern for this user can be cancelled automatically.

This approach to detecting the presence of a visitor in the vicinity of a sensor can also be used to offer valued customers a special service. For example, a certain shop might want to offer certain valued customers a special discount. By means of a communication between this shop and the central control arrangement, a light pattern for a certain customer can be rendered when a sensor determines that that customer is in the shopping mall. The customer can be guided to that shop if he has not already specified a different chosen destination, or a light pattern can be rendered outside that shop when the visitor is detected in the vicinity. The light pattern might have been assigned to that visitor previously, or he may have designed his own personalized light pattern.

As already mentioned, a lighting arrangement can be controlled so that its light sources change colour or change their intensity, the light sources can also be controlled so that one or more of them flash on and off, etc. Altogether, the light sources are controlled to render the specific pattern intended for the user. However, since the user quite likely does not know where the chosen destination actually is, relative to his current position, it would be more advantageous if the specific light pattern could also provide him with a pointer in the right direction. Therefore, in a further preferred embodiment of the invention, a number of selected light sources are driven to render the specific light pattern such that the specific light pattern appears to move in a certain direction. This effect can be achieved in a number of ways. For example, if the lighting arrangement comprises a group of light sources arranged one after another in a line, whether on a floor, a wall, or on a ceiling, the rendering sequence for this lighting arrangement can comprise commands or instructions to cause the light sources to be sequentially turned on and off again in a staggered manner such that an overall impression is given that the lights appear to move in the direction of the chosen destination. A lighting arrangement mounted overhead might comprise a downlighter or a gobo projector. This type of projector, known to a person skilled in the art, comprises an image element such as a plate with openings to allow some light to pass through, placed in front of a moveable lighting arrangement. By applying an appropriate rendering sequence for the lighting arrangement, an image is projected onto a surface, for example a floor, wall, or ceiling. Causing light to be cast on a floor or wall in this manner is also referred to as 'wall-washing'. When the lighting arrangement is controlled to move in the direction of the chosen destination, the image projected in this manner follows the motion of the lighting arrangement to give a 'follow me' effect, and the user is visually guided in the right direction.

Evidently, a light guidance system according to the invention can simultaneously guide a number of visitors to different target destinations. To this end, lighting arrangements for use in a light guidance system according to the invention can comprise any number of light sources, controllable individually, in groups, or as a whole. For example, the light sources of a lighting arrangement can be caused to alternately render a first light pattern and then a second light pattern for a first and second visitor, respectively. Obviously, this alternate rendering is not limited to two different light patterns—any number of different light patterns could be rendered in this way. Neither is the lighting arrangement restricted to an alternate rendering, since a number of light patters could conceivably be rendered at the same time by a single lighting arrangement. For instance, in a lighting arrangement that comprises a row of light sources arranged along the length of a corridor, every second light source could be used to render a blue pattern appearing to move in one direction, while the remaining light sources render a yellow pattern that appears to move in the opposite direction. Such alternate or simultaneous patterns are created using appropriate rendering sequences.

The commands in a rendering sequence are applied to some or all of the light sources of a lighting arrangement. Therefore, in a light guidance system according to the invention, a lighting arrangement preferably comprises a rendering interface capable of performing according to an industry standard protocol. Examples of such protocols, specifically developed for the purposes of controlling complex lighting arrangements, for example stage lighting or lighting systems for buildings, are the DALI (Digital Addressable Lighting Interface) and the established DMX512-A communications protocol. These protocols allow individual lighting arrangements to be addressed and controlled or programmed in a flexible and straightforward manner. A light pattern can be defined by a sequence of commands, entered manually, for example by a system administrator, or by a user with the help of a graphical user interface to interpret the colours and patterns chosen by a user into the appropriate lines of code required by the rendering interface.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
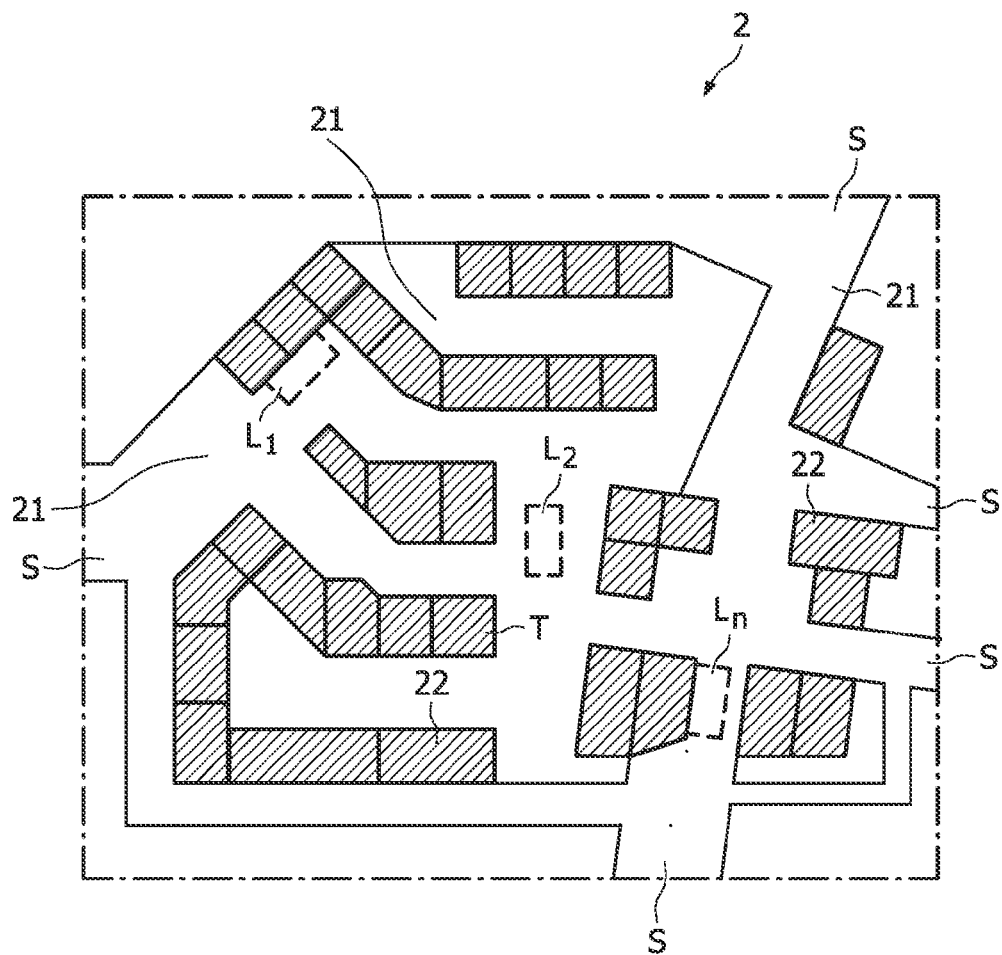
FIG. 1 shows a schematic representation of the layout of a public area.

FIG. 1 shows the layout of a public area 2 in the form of a map, and also shows possible starting points S for visitors to that public area 2. Typical starting points would be points of entry to the public area 2, for example an entrance from a street, from a car-park, or from an underground public transport system. In this example, the public area 2 is a mall, with any number of businesses 22 such as shops, restaurants, cafes, etc., indicated by the shaded blocks, any of which can be a destination T for a visitor to the public area 2. To guide a visitor to his destination T, a light guidance system is used, with lighting arrangements $L_1, L_2, \ldots, L_n$ installed at certain positions in corridors 21 or walkways 21 about the public area 2. Only a few lighting arrangements are indicated for the sake of clarity; obviously there would be no set limit to the number of lighting arrangements that could be installed in the public area 2.

Figure 2:
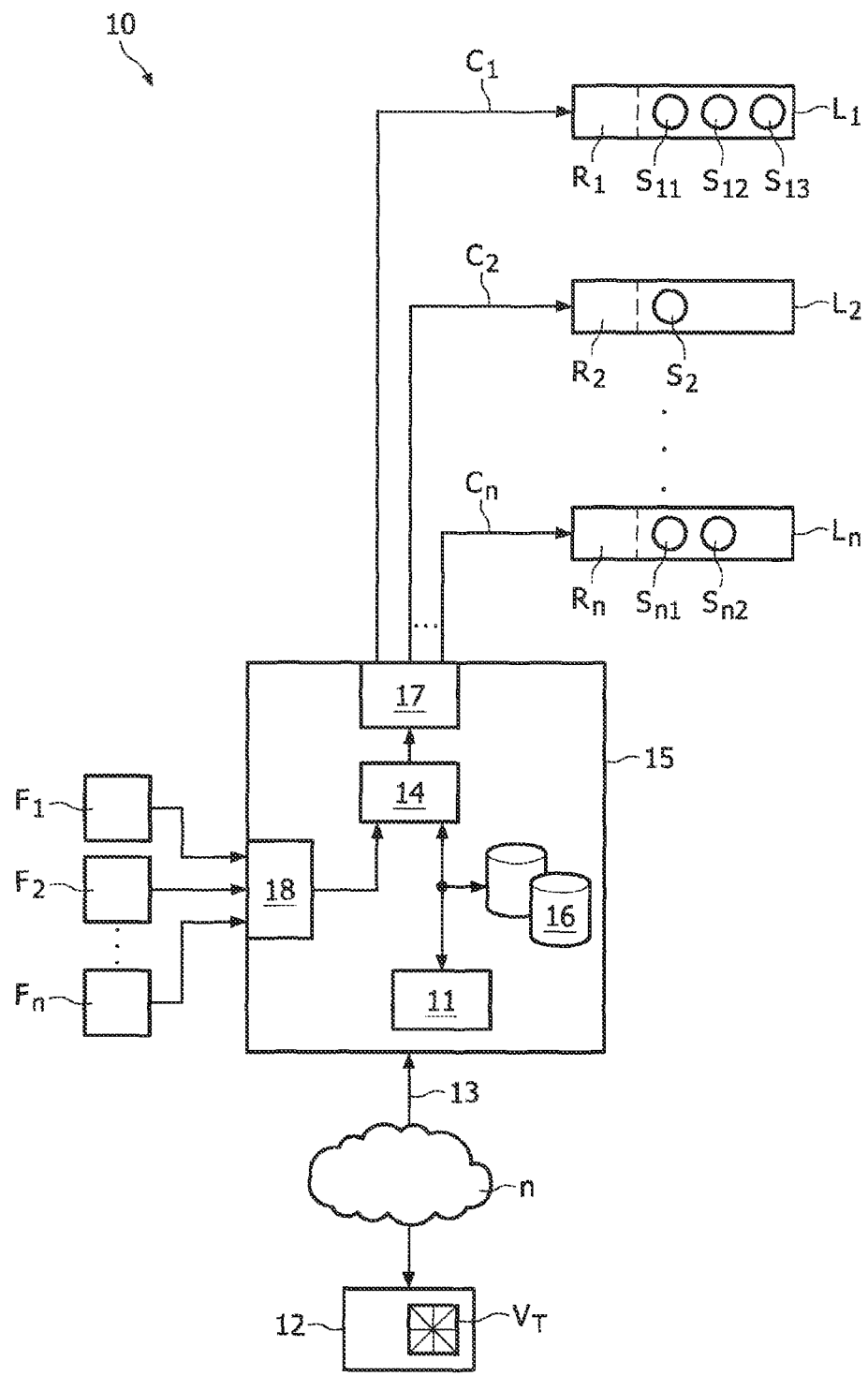
FIG. 2 shows a block diagram of an embodiment of a light guidance system according to the invention.

Such a light guidance system according to the invention is explained with the aid of a block diagram in FIG. 2. The light guidance system 10 comprises a number of lighting arrangements $L_1, L_2, \ldots, L_n$ which are controlled by control signals $C_1, C_2, \ldots, C_n$ issued by a control arrangement 15. The control arrangement can be located in some suitable place in the public area, for example in a control room accessible to service staff or technicians. The control signals $C_1, C_2, \ldots, C_n$, for each lighting arrangements $L_1, L_2, \ldots, L_n$ are carried or transmitted in the usual manner, for example by means of electrical wiring. Each lighting arrangement $L_1, L_2, \ldots L_n$ has a corresponding rendering interface $R_1, R_2, \ldots, R_n$ for applying the control signal $C_1, C_2, \ldots, C_n$, to its light sources $S_{11}, S_{12}, S_{13}, S_2, S_{n1}, S_{n2}$. Again, only a small number of light sources $S_{11}, S_{12}, S_{13}, S_2, S_{n1}, S_{n2}$ is shown, evidently the number of light sources $S_{11}, S_{12}, S_{13}, S_2, S_{n1}, S_{n2}$ used in the light guidance system 10 will be governed by, among others, the capabilities of the control arrangement 15, the available bandwidth for carrying the control signals $C_1, C_2, \ldots, C_n$, and the realisations of the lighting arrangements $L_1, L_2, \ldots, L_n$ themselves.

In the control arrangement 15, memory 16 in the form of a database 16 is used to store information describing the light patterns that can be rendered by the lighting arrangements $L_1$, $L_2$, ..., $L_n$. A light pattern allocator 11 allocates one of the light patterns in the memory 16, or a light pattern entered by a user, to the chosen destination. The specific lighting arrangements $L_1$, $L_2$, ..., $L_n$, to render this light pattern are selected by a selecting unit 14 according to a target destination chosen by the user, not shown in the diagram In a control interface 17, appropriate control signals $C_1$, $C_2$, ..., $C_n$, are assembled for the selected lighting arrangements $L_1$, $L_2$, ..., $L_n$, according to the light pattern description.

The user can enter his wishes by means of a user interface 12. This can be a console in a public area or a personal computer or mobile device separate from the public area. The user can specify a light pattern by choosing one from a selection of proffered light patterns, or can compile his own light pattern. A visual depiction $V_T$ of the chosen light pattern is shown to the user in a screen of the user interface 12. Information entered by means of the user interface 12, such as a destination description 13, is delivered to the control arrangement 15 over a suitable network N, which can be wired if the user interface 12 is a console in the public area, or wireless, for example the internet, if the user interface 12 is external to the public area. When the user chooses his destination prior to his arrival in the public area, for example before leaving home, the destination descriptor and a chosen light pattern can be stored in the memory 16 until required.

Detectors $F_1$, $F_2$, ..., $F_m$ distributed about the public area provide the control arrangement 15 with information that can be used in a tracking unit 18 to register the arrival of the user, or to track or follow the movements of the user in the public area. This information is provided in a suitable manner to the selecting unit 14, so that lighting arrangements $L_1$, $L_2$, ..., $L_n$, in the vicinity of the user are controlled to render the chosen light pattern.

Figure 3:
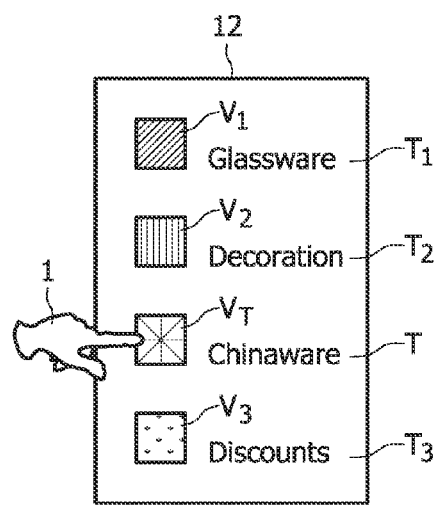
FIG. 3 shows a graphical representation of an embodiment of a user interface with a visual depiction of a light pattern.

FIG. 3 shows a graphical representation of a user interface 12 for a public area such as shopping mall. Here, the user interface 12 comprises a touch-sensitive screen in which a number of destinations $T_1$, $T_2$, T, $T_3$ are listed, each with a visual depiction $V_1$, $V_2$, $V_T$, $V_3$ of an associated light pattern. The user 1 (indicated by a hand) in this example wishes to be guided to a chinaware shop in the shopping mall, and therefore selects the light pattern associated with that destination T and indicated by the visual depiction $V_T$. Noting this pattern, the user 1 can then be guided to any or all of the chinaware shops in the shopping mall by simply following the selected light pattern, rendered by the lighting arrangements. In this example, predefined light patterns have been allocated in advance to the destinations $T_1$, $T_2$, T, $T_3$ shown in the user interface 12.

Figure 4:
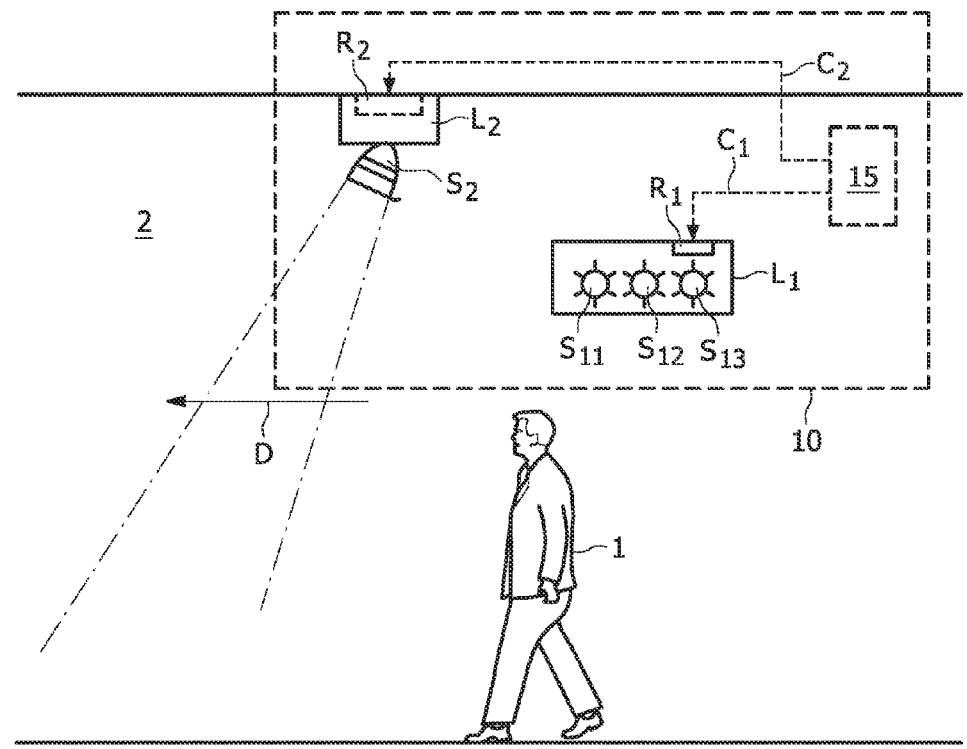
FIG. 4 shows a user being guided by a light pattern under application of the method according to the invention.

FIG. 4 shows a visitor 1 being guided by the chosen light pattern under application of the method according to the invention. The visitor 1 has previously entered his destination, was shown a visual depiction of the light pattern, and is now following the light pattern through the public area 2 in the direction D to lead him to his destination. A control arrangement 15 is controlling two lighting arrangements $L_1$, $L_2$ to render the light pattern. Lighting arrangement $L_1$ has three light sources $S_{11}$, $S_{12}$, $S_{13}$ and a rendering interface $R_1$. These light sources $S_{11}$, $S_{12}$, $S_{13}$ are controlled by a control signal $C_1$ issued by the control arrangement 15. The control signal $C_1$, applied by the rendering interface $R_1$, causes the light sources $S_{11}$, $S_{12}$, $S_{13}$ of the lighting arrangement $L_1$ to alternately flash in red and white, thus rendering the light pattern that was shown to the visitor 1. The other lighting arrangement $L_2$ has a single light source $S_2$, a motor or actuator, and a gobo element. These can be controlled by a control signal $C_2$ interpreted by a rendering interface $R_2$ of the lighting arrangement $L_2$ to cause an image corresponding to the light pattern chosen by the visitor 1 to be projected or cast onto the floor in front of the visitor 1, and to move in the direction D of the visitor's chosen destination.

Figure 5:
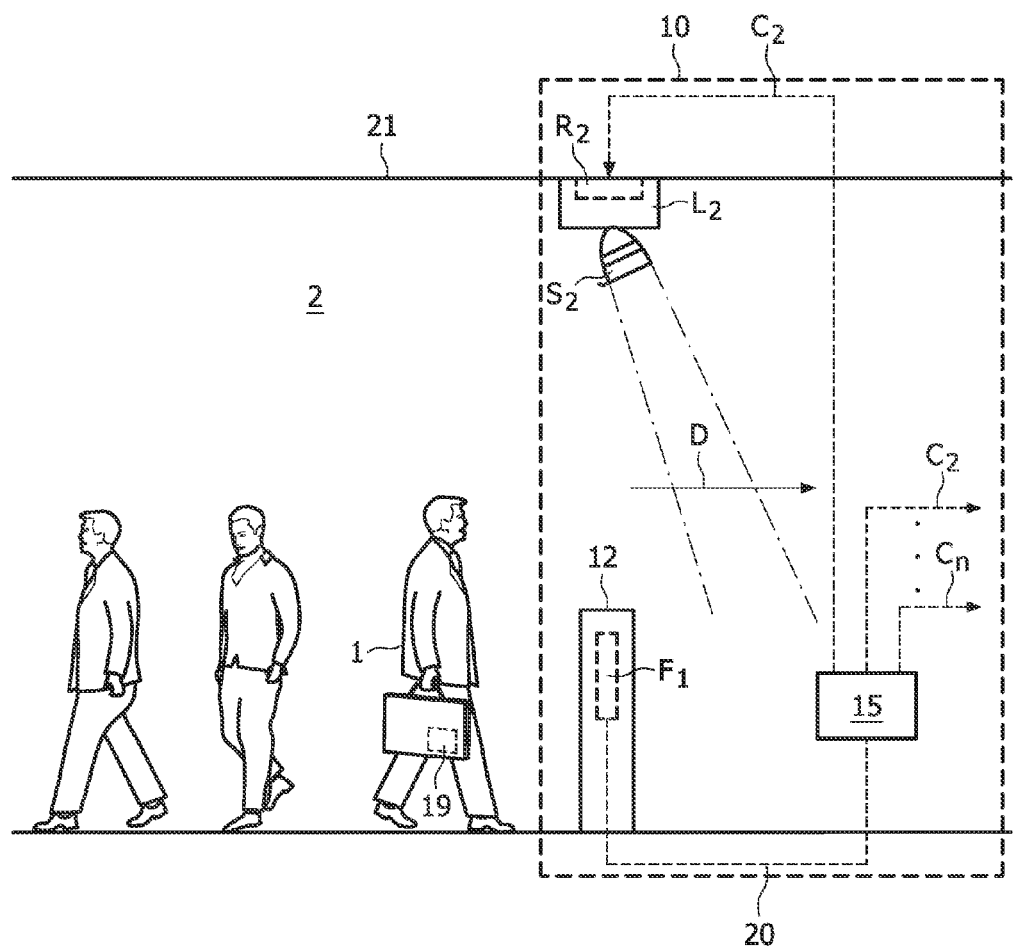
FIG. 5 illustrates the control, in response to a trigger event, of a lighting arrangement of a light guidance system in a further embodiment of the invention.

FIG. 5 illustrates the control of a lighting arrangement $L_2$ of a light guidance system 10 in response to a trigger event, triggered by a visitor 1 to a public area 2. The visitor 1, prior to arriving at the public area 2, has selected his destination and chosen a light pattern to guide him there. He may have done this, for example, by accessing a website for that public area 2 over the internet. The public area 2 is equipped with a console 12, positioned at a suitable point of entry to the public area 2, in which is incorporated a detector $F_1$ for detecting RFID tags. The visitor 1 carries a customer card 19 with an RFID tag to identify him. As the visitor 1 approaches or passes the console 12, the detector $F_1$ detects the RFID tag in the visitor's card 19, and communicates this event by means of a trigger signal 20 to a control arrangement 15 of the light guidance system 10, indicated by the dashed lines. The trigger signal 20 includes identification information for that visitor 1, read from the RFID tag. Using this information, the control arrangement 15 retrieves the previously chosen destination for that visitor 1, as well as the corresponding previously selected light pattern. Then, the control arrangement 15 causes appropriate control signals $C_1$, $C_2$, ..., $C_n$ to be issued to the lighting arrangements in the public area 2. One lighting arrangement $L_2$ is shown mounted on a ceiling 21. On passing the console 12, the visitor 1 is guided to his destination by a light pattern rendered by this lighting arrangement $L_2$, which casts the previously chosen light pattern onto the floor in front of the visitor 1 and in the direction D of the chosen destination.

More detectors can be distributed about the public area, as mentioned already. These detectors can register whenever the visitor 1 passes by, so that the progress of the visitor can be tracked throughout the public area 2, allowing him to make detours on his journey to the chosen destination. The detectors inform the control arrangement 15 of the location of the visitor in the public area 2, so that any control signals $C_1$, $C_2$, ..., $C_n$ issued by the control arrangement 15 to the lighting arrangements of the public area 2 can be adjusted accordingly, particularly when the direction of a light pattern needs altering as a result of a detour taken by the visitor.

Although the present invention has been disclosed in the form of preferred embodiments and variations thereon, it will be understood that numerous additional modifications and variations could be made thereto without departing from the scope of the invention. For example, a light guidance system according to the invention can be augmented at any time to handle additional lighting arrangements, for example to enhance the light pattern generation by including seasonal effects. Also, the light guidance system could be used to guide visitors to temporary attractions in the public area, for example by guiding shoppers in a mall to a special offer by rendering a light pattern associated with that special offer. The pattern associated with the special offer could be made known to the visitors in the public area by an audible announcement e.g. "Follow the yellow star-bursts" or visually in a video display or in a brochure or flyer handed out to the visitors. Furthermore, light guidance systems for different but related public areas, such as shopping malls located in different cities, may exchange information about personalised light patterns for valued customers, so that such a customer visiting any of these public areas can always be greeted with his own personalised and familiar light patterns.

The user may store one or more personalised light patterns on a customer card which could be automatically read when the user enters a public area with a light guidance system capable of reading such a card.

For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A method of guiding a user from an initial position to a destination, chosen from among a plurality of possible destinations, in a public area over which is distributed a plurality of lighting arrangements ($L_1, L_2, \ldots, L_n$) each of which can be driven to render one or more light patterns from a plurality of light patterns, which method comprises the steps of
   - determining the chosen destination by obtaining a destination descriptor from the user;
   - allocating a specific light pattern from the plurality of light patterns to the chosen destination;
   - providing the user with a depiction of the specific light pattern allocated to the chosen destination;
   - selecting a number of lighting arrangements ($L_1, L_2, \ldots, L_n$) between a starting point of the user (1) and the chosen destination;
   - driving the selected lighting arrangements ($L_1, L_2, \ldots, L_n$) such that the selected lighting arrangements ($L_1, L_2, \ldots, L_n$) between the starting point of the user (1) and the chosen destination render the specific light pattern;
   - wherein the specific light pattern is composed by the user.

2. The method according to claim 1, wherein a lighting arrangement ($L_1, L_2, \ldots, L_n$) comprises a number of individual light sources ($S_{11}, S_{12}, S_{13}, S_2, S_{n1}, S_{n2}$), and a light pattern is generated by applying a rendering sequence ($C_1, C_2, \ldots, C_n$) to the lighting arrangement ($L_1, L_2, \ldots, L_n$) such that, when a lighting arrangement ($L_1, L_2, \ldots, L_n$) is driven to render a light pattern, individual light sources ($S_{11}, S_{12}, S_{13}, S_2, S_{n1}, S_{n2}$) of the lighting arrangement ($L_1, L_2, \ldots, L_n$) are controlled according to the rendering sequence ($C_1, C_2, \ldots, C_n$).

3. The method according to claim 1, wherein the rendering sequence ($C_1, C_2, \ldots, C_n$) for a lighting arrangement ($L_1, L_2, \ldots, L_n$) comprises a sequence of instructions for altering the operation mode or light output and/or light colour of a light source ($S_{11}, S_{12}, S_{13}, S_2, S_{n1}, S_{n2}$) of the lighting arrangement ($L_1, L_2, \ldots, L_n$).

4. The method according to claim 1, wherein the position of the user in the public area is determined, and selected lighting arrangements ($L_1, L_2, \ldots, L_n$) in the vicinity of the user are driven to render the specific light pattern.

5. The method according to claim 1, wherein the specific light pattern is associated with a desired product or service provided at the chosen destination of the user.

6. The method according to claim 1, wherein a number of selected light sources ($S_{11}, S_{12}, S_{13}, S_2, S_{n1}, S_{n2}$) are driven to render the specific light pattern such that the specific light pattern appears to move in a certain direction.

7. The method according to claim 1, wherein a specific light pattern is associated with the chosen destination prior to arrival of the user at the initial position in the public area.

8. The method according to claim 1, wherein the rendering of a specific light pattern is triggered by a trigger signal.

9. The method according to claim 8, wherein the trigger signal is generated when the presence of the user is detected in the public area.

10. The A light guidance system for guiding a user from an initial position to a destination in a public area, which light guidance system comprises
    - a plurality of lighting arrangements ($L_1, L_2, \ldots, L_n$) distributed over the public area (2), which lighting arrangements ($L_1, L_2, \ldots, L_n$) can be driven to render one or more light patterns from a plurality of light patterns;
    - a light pattern allocator for allocating a specific light pattern from the plurality of light patterns to a chosen destination;
    - a user interface for obtaining a destination description from the user (1) and for providing the user (1) with a depiction ($V_T$) of a specific light pattern allocated to the destination (T);
    - a selecting unit for selecting a number of lighting arrangements ($L_1, L_2, \ldots, L_n$) between the initial position of the user and the chosen destination;
    - a rendering interface ($R_1, R_2, \ldots, R_n$) for driving the selected lighting arrangements ($L_1, L_2, \ldots, L_n$) between the starting point of the user and the chosen destination to render the specific light pattern;
    - wherein a lighting arrangement ($L_1, L_2, \ldots, L_n$) comprises a rendering interface ($R_1, R_2, \ldots, R_n$) for applying a rendering sequence ($C_1, C_2, \ldots, C_n$) to a number of individual light sources ($S_{11}, S_{12}, S_{13}, S_2, S_{n1}, S_{n2}$) of the lighting arrangement ($L_1, L_2, \ldots, L_n$) such that the individual light sources ($S_{11}, S_{12}, S_{13}, S_2, S_{n1}, S_{n2}$) of the selected lighting arrangement ($L_1, L_2, \ldots, L_n$) are controlled according to the rendering sequence ($C_1, C_2, \ldots, C_n$);
    - and further including a control arrangement with a storage medium for storing descriptions of predefined light patterns and, optionally, for storing a description of a light pattern composed by a user;
    - wherein the user interface is located external to the public area, and the user interface is connected by a network to the control arrangement.

* * * * *